(12) United States Patent
Kojima

(10) Patent No.: US 7,581,842 B2
(45) Date of Patent: Sep. 1, 2009

(54) ILLUMINATION APPARATUS AND IMAGE-TAKING APPARATUS

(75) Inventor: Nobuhisa Kojima, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 631 days.

(21) Appl. No.: 11/304,405

(22) Filed: Dec. 14, 2005

(65) Prior Publication Data

US 2006/0139481 A1  Jun. 29, 2006

(30) Foreign Application Priority Data

Dec. 28, 2004  (JP) .............................. 2004-381783

(51) Int. Cl.
  *F21V 5/02*  (2006.01)
(52) U.S. Cl. ...................... 362/16; 362/217.02; 362/18; 362/339
(58) Field of Classification Search .................. 362/16, 362/339, 257, 317, 17, 18, 217.02, 311.01, 362/311.06, 333, 224, 331, 332, 8; 396/199
See application file for complete search history.

(56) References Cited

U.S. PATENT DOCUMENTS

| | | | | |
|---|---|---|---|---|
| 4,356,538 A * | 10/1982 | Plummer | ..................... | 362/217 |
| 6,467,931 B2 * | 10/2002 | Tenmyo | ...................... | 362/223 |
| 6,632,004 B2 * | 10/2003 | Sugawara et al. | ............ | 362/281 |
| 6,974,236 B2 * | 12/2005 | Tenmyo | ...................... | 362/340 |

FOREIGN PATENT DOCUMENTS

JP  2001-337372  12/2001

* cited by examiner

*Primary Examiner*—Bao Q Truong
(74) *Attorney, Agent, or Firm*—Cowan, Liebowitz & Latman, P.C.

(57) ABSTRACT

An illumination apparatus having a structure which can make the inside of the apparatus hard to be seen from the outside without deterioration of light distribution, and is applicable to illumination apparatuses having an optical member utilizing total reflection. The illumination apparatus comprises a light-emitting tube extending in a first direction; and an optical member including an entrance portion where a luminous flux from the light-emitting tube enters and an exit portion where the luminous flux exits. The exit portion includes a plurality of surfaces arranged in a second direction orthogonal to the first direction, the surfaces being orthogonal or inclined with respect to the optical axis direction, and located at different positions in the optical axis direction.

2 Claims, 15 Drawing Sheets

LIGHT DISTRIBUTION CHARACTERISTIC

| ANGLE | LEFT | RIGHT | UP | DOWN |
|---|---|---|---|---|
| 0.00 | 0.00 | 0.00 | 0.00 | 0.00 |
| 5.00 | 0.01 | 0.01 | -0.03 | -0.03 |
| 10.00 | -0.02 | -0.02 | -0.20 | -0.20 |
| 15.00 | -0.04 | -0.04 | -0.30 | -0.30 |
| 20.00 | -0.16 | -0.16 | -0.51 | -0.51 |
| 25.00 | -0.26 | -0.26 | -1.13 | -1.13 |
| 30.00 | -0.30 | -0.30 | -3.15 | -3.15 |
| 35.00 | -0.76 | -0.76 | -3.76 | -3.76 |
| 40.00 | -1.47 | -1.47 | -4.38 | -4.38 |
| 45.00 | -1.97 | -1.97 | -6.24 | -6.24 |
| 50.00 | -2.30 | -2.30 | -8.22 | -8.22 |
| 55.00 | -2.18 | -2.18 | -8.62 | -8.62 |
| 60.00 | -2.79 | -2.79 | -11.91 | -11.91 |

LIGHT DISTRIBUTION CHARACTERISTIC

| ANGLE | LEFT | RIGHT | UP | DOWN |
|---|---|---|---|---|
| 0.00 | 0.00 | 0.00 | 0.00 | 0.00 |
| 5.00 | 0.00 | 0.00 | -0.02 | -0.02 |
| 10.00 | -0.03 | -0.03 | -0.17 | -0.17 |
| 15.00 | -0.04 | -0.04 | -0.26 | -0.26 |
| 20.00 | -0.17 | -0.17 | -0.44 | -0.44 |
| 25.00 | -0.27 | -0.27 | -1.07 | -1.07 |
| 30.00 | -0.31 | -0.31 | -3.03 | -3.03 |
| 35.00 | -0.77 | -0.77 | -3.65 | -3.65 |
| 40.00 | -1.48 | -1.48 | -4.29 | -4.29 |
| 45.00 | -1.97 | -1.97 | -6.09 | -6.09 |
| 50.00 | -2.30 | -2.30 | -8.01 | -8.01 |
| 55.00 | -2.19 | -2.19 | -8.63 | -8.63 |
| 60.00 | -2.79 | -2.79 | 11.92 | 11.92 |

ILLUMINATION APPARATUS AND IMAGE-TAKING APPARATUS

BACKGROUND OF THE INVENTION

The present invention relates to illumination apparatuses, which are provided in image-taking apparatuses such as digital cameras, and illuminates objects.

Illumination apparatuses used in image-taking apparatus generally comprise a light source, reflector which leads a luminous flux emitted from the light source forward (object side), and an optical member, such as a Fresnel lens, which is arranged in front of the light source for obtaining a predetermined light distribution characteristic.

In such illumination apparatuses, unevenness of light distribution tends to occur because of forming errors of the reflector and optical member, and displacements between the light source, reflector and optical member. An illumination apparatus has been disclosed in which a plurality of cylindrical lens surfaces having a concave shape are formed on the entrance surface of an optical member (protector) in Japanese Patent Laid-Open Application No. 2001-337372. The cylindrical lens surface is generally extends in a direction parallel to a rod-like light-emitting tube, and diverges the flash light from the light-emitting tube to reduce the unevenness of light distribution.

The miniaturization of illumination apparatuses is required according to the miniaturization of image-taking apparatuses, and the improvement of light use efficiency (light condensing efficiency) is particularly required while reducing the height of the image-taking apparatus. An illumination apparatus has been proposed in which the improvement of light condensing efficiency and the reduction of the height of the optical system are achieved by using an optical member utilizing total reflection, such as a prism and light guide.

Moreover, recent image-taking apparatuses are designed so that the inside of the illumination apparatus (the light-emitting tube, terminals, or the like) cannot be seen from the outside.

In the illumination apparatus disclosed in Japanese Patent Laid-Open Application No. 2001-337372, since the plurality of cylindrical lens surfaces for reducing the unevenness of light distribution are formed on the entrance surface of the optical member, the inside of the illumination apparatus is hard to be seen from the outside. However, it is difficult to obtain the required light distribution characteristic and light condensing efficiency in a case where the plurality of cylindrical lens surfaces are formed on the entrance surface of the above-mentioned optical member utilizing total reflection. In other words, the structure is not adequate to the illumination apparatus in which the reduction of its height is particularly required.

BRIEF SUMMARY OF THE INVENTION

One object of the present invention is to provide an illumination apparatus having a structure which can make the inside of the apparatus hard to be seen from the outside without deterioration of the light distribution, and is applicable to illumination apparatuses having an optical member utilizing total reflection. Another object of the present invention is to provide an image-taking apparatus with the illumination apparatus.

An illumination apparatus as one aspect of the present invention comprises a light-emitting tube which extends in a first direction; and an optical member which includes an entrance portion where a luminous flux from the light-emitting tube enters and an exit portion where the luminous flux exits. The exit portion includes a plurality of surfaces which are arranged in a second direction orthogonal to the first direction, the surfaces being orthogonal or inclined with respect to the optical axis direction of the illumination apparatus, and located at different positions in the optical axis direction.

Other objects and further features of the present invention will become readily apparent from the following description of the preferred embodiments with reference to accompanying drawings.

DETAILED DESCRIPTION OF THE PREFERRED EMBODIMENTS

Preferred embodiments of the present invention will hereinafter be described with reference to the drawings.

Embodiment 1

Figure 1:
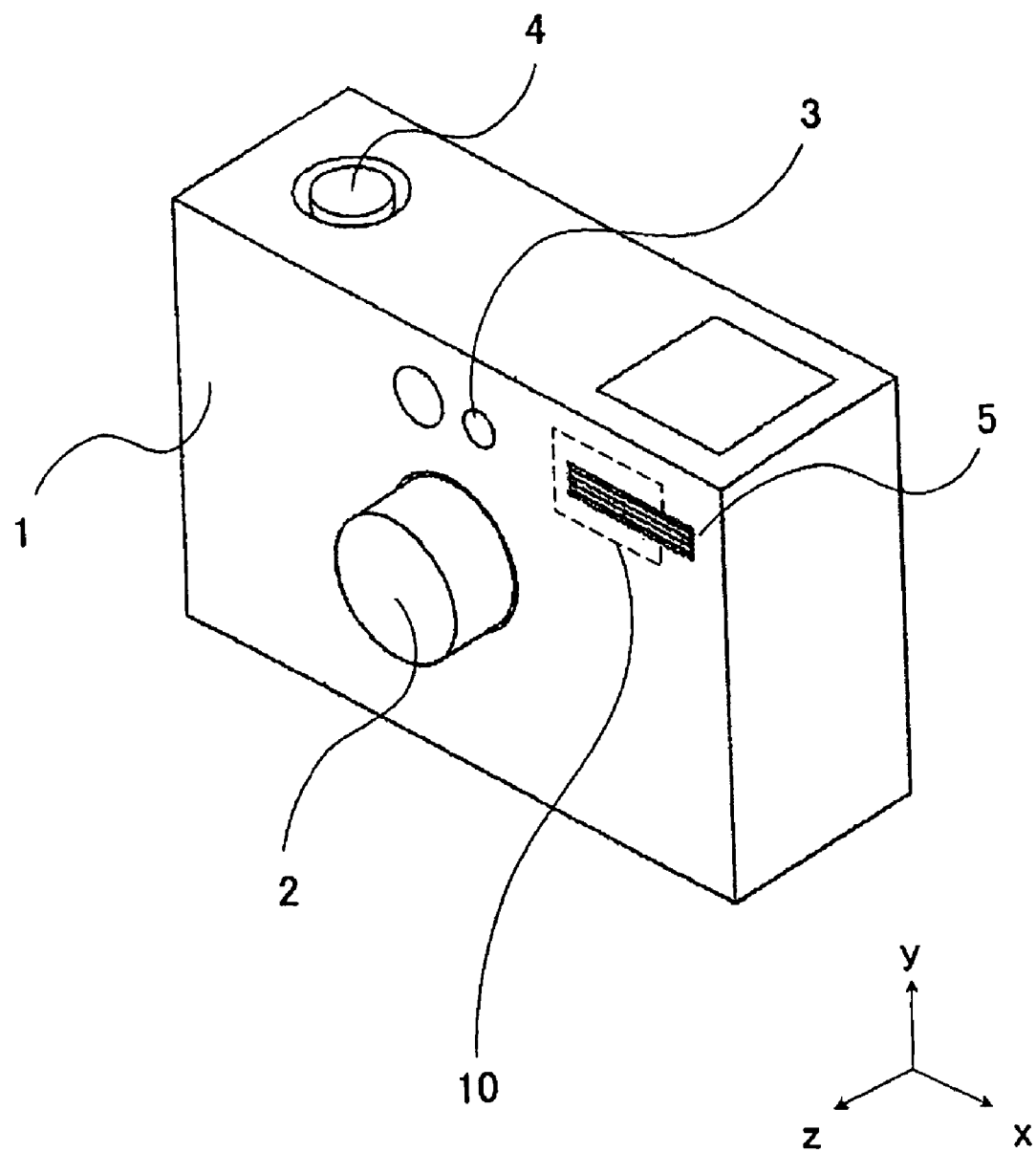
FIG. 1 is a perspective view showing a camera equipped with the illumination unit that is Embodiment 1 of the present invention.

FIG. 1 shows a camera equipped with the illumination unit (illumination apparatus) that is Embodiment 1 of the present invention. In FIG. 1, 1 denotes a camera body. 2 denotes a lens barrel which is provided at the front of the camera body 1, and holds a taking lens, not shown in the figure. 3 denotes an optical finder. 4 denotes a release button which causes the camera to execute an image-taking operation. 5 denotes the illumination unit. The illumination unit 5 is provided at the upper right portion of the front of the camera body 1, and illuminates an object when taking images.

10 denotes an image-pickup element such as a CCD sensor and a CMOS sensor. The image-pickup element 10 converts an object image formed by the taking lens into electronic signals to generate image-taking signals. An image processor, not shown in the figure, processes the image-taking signals to generate video signals. When the release button is operated, a part of the video signals is captured and recorded to a recording medium such as a semiconductor memory. A silver-halide film may be used instead of the image-pickup element 10 in this embodiment.

Figure 2:
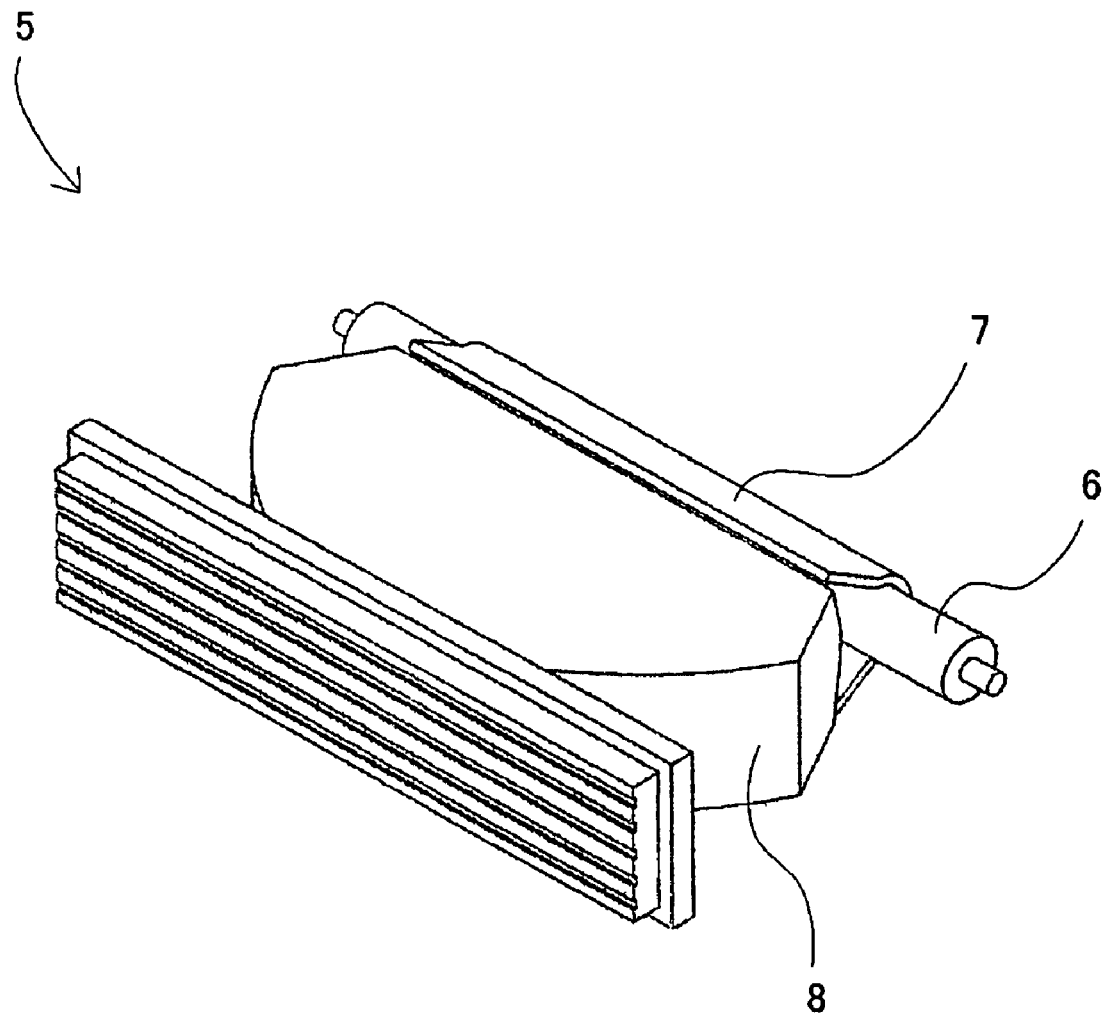
FIG. 2 is a perspective view showing the illumination unit of Embodiment 1.
Figure 3:
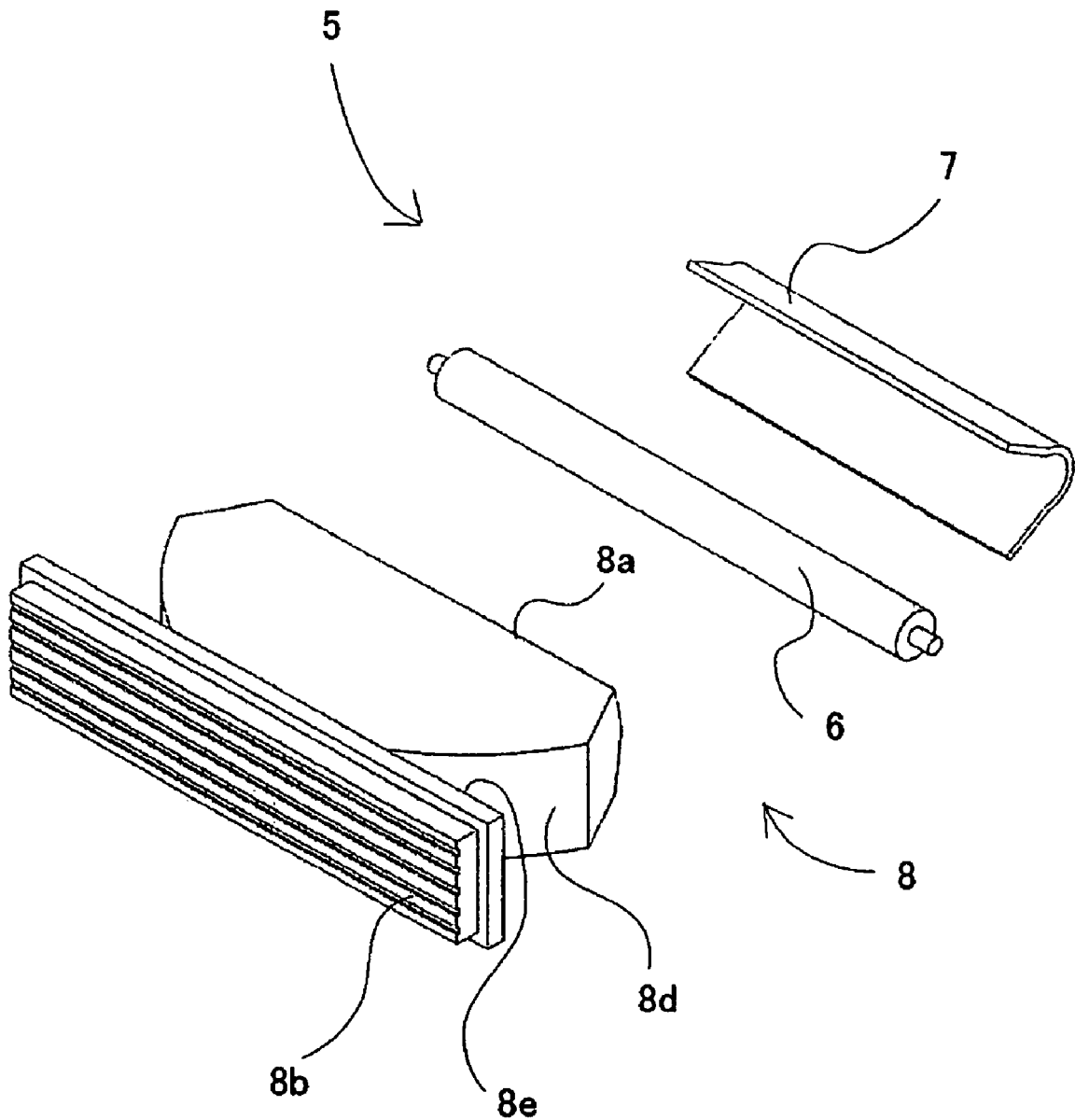
FIG. 3 is an exploded perspective view showing the illumination unit of Embodiment 1.

FIG. 2 shows the structure of the illumination unit 5. FIG. 3 is an exploded view of the illumination unit 5.

The illumination unit 5 includes a cylindrical flash discharge tube (light-emitting tube) 6 such as a xenon tube, and a reflector 7. The reflector 7 reflects forward (toward the object) the luminous flux that has progressed in the backward direction (opposite to the object) other than the forward direction and in the vertical direction among luminous fluxes emitted radially from the flash discharge tube 6. The reflector 7 has a one-dimensional curvature in the vertical direction, and is made of a metallic material, such as bright aluminum, that has an inner, high-reflectance surface, or a resin material that has an inner, high-reflectance, metallic evaporated surface, etc.

Furthermore, the illumination unit 5 includes an optical member 8. The optical member 8 converts the luminous flux directly entering from the flash discharge tube 6 or reflected on the reflector 7 into a luminous flux having a predetermined light distribution characteristic to lead it efficiently to the object. The optical element 8 is made of an optical resin material having a high transmittance, such as acrylate resin, or a grass material.

In the above-described camera, a CPU (not shown) determines whether the illumination unit 5 is to emit light or not, based on the object brightness measured by a photometric unit (not shown) and a measurement result of the image-pickup element or the sensitivity of the film, in response to the first stroke operation (half-press operation) of the release button 4, for example, when the camera is set to a "flash automatic mode".

When determining that the "illumination unit is to emit light" under the current image-taking condition, the CPU instructs to take an image (and record the image), outputs an emission signal to cause the flash discharge tube 6 to emit light via a trigger lead (not shown) attached to the reflector 7, in response to the second stroke operation (full-press operation) of the release button 4.

The most object side surface of the optical member 8 constituting the illumination unit 5 does not have a Fresnel lens surface or the like that controls the light distribution characteristic in the horizontal direction in this embodiment. However, adequate setting of the shapes of the optical member 8 and reflector 7 optimizes the light distribution characteristic in the horizontal direction. Moreover, adequate setting of the shapes of the entrance surface of the reflector 7 and optical member 8 also optimizes the light distribution characteristic in the vertical direction.

Figure 4:
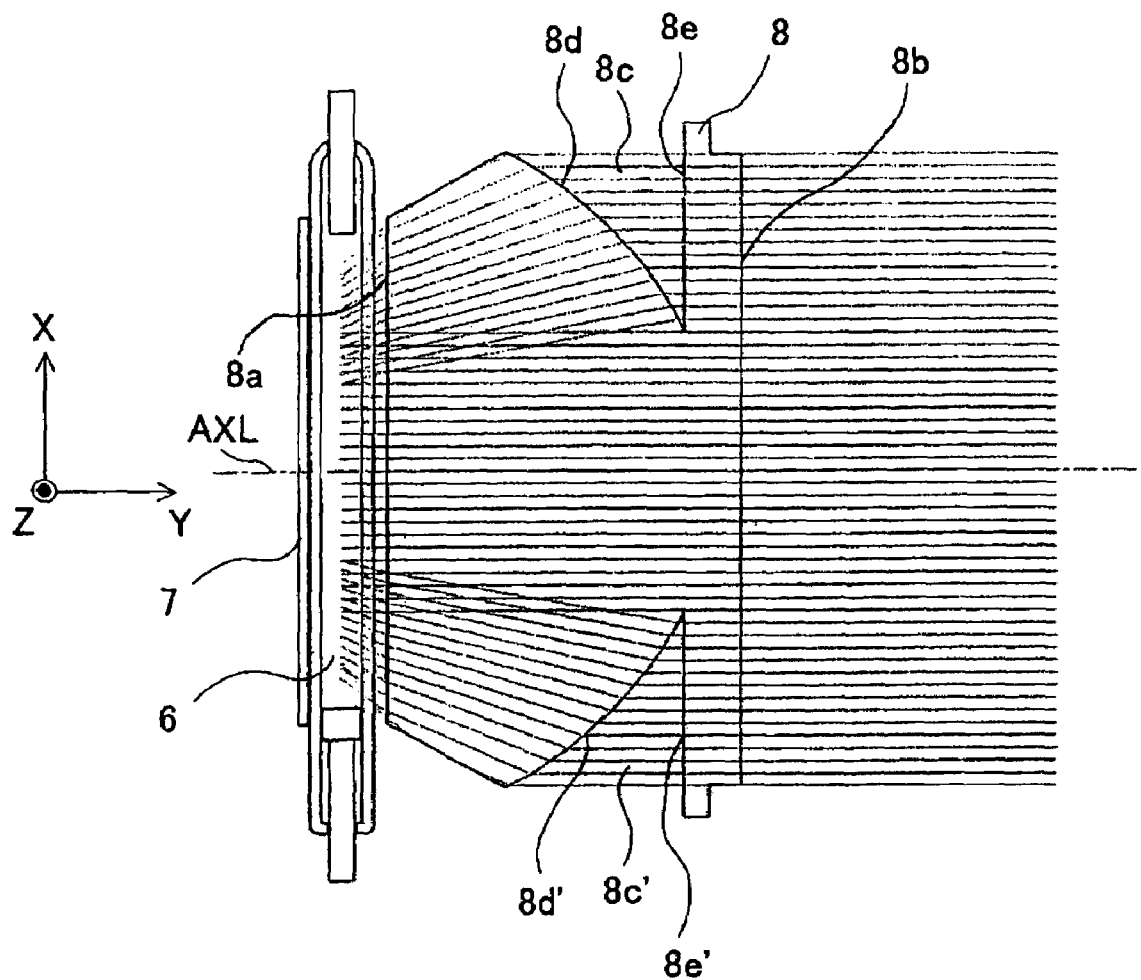
FIG. 4 is a top perspective view showing the illumination unit of Embodiment 1.

FIG. 4 shows a top cross-sectional surface of the illumination unit 5 when cutting the unit 5 at a plane including the central axis of the flash discharge tube 6, the central axis extending in the longitudinal direction that is a first direction. The figure shows only a luminous flux emitted forward from the flash discharge tube 6 and progressing in the direction of the optical axis AXL (hereinafter, the direction is referred to as an optical axis direction or Y-direction) on the radiation plane. The figure shows the area actually used in the control of the luminous flux in each constituent of the illumination unit 5, and the path of the luminous flux progressing in the optical axis direction on the radiation plane.

In FIG. 4, the luminous flux emitted from the flash discharge tube 6 enters the optical member 8 from a first entrance surface 8a formed in the portion closest to the flash discharge tube 6 in the optical member 8, and finally emerges from a first exit surface 8b formed in the portion farthest from the flash discharge tube 6 in the optical member 8. In the left and right portions (the upper and lower portions in FIG. 4, hereinafter, this direction is referred to as X-direction) between the first entrance surface 8a and the first exit surface 8b, second exit surfaces 8d and 8d' are formed, and furthermore second entrance surfaces 8e and 8e' are formed. Spaces 8c and 8c' are formed between the second exit surfaces 8d and 8d' and the second entrance surfaces 8e and 8e'.

In FIG. 4, a first luminous flux in the vicinity of the optical axis AXL among the luminous flux emitted from the flash discharge tube 6 enters the optical member 8 from the first entrance surface 8a, and then emerges from the first exit surface 8b with a narrow radiation angle range without passing through the spaces 8c and 8c'. The radiation range of the first luminous flux is set to an angle range meeting the image-taking range through the taking lens.

On the other hand, a second luminous flux emitted from the flash discharge tube 6 at an angle equal to or larger than a predetermined angle with respect to the optical axis AXL enters the optical member 8 from the first entrance surface 8a, emerges from the second exit surfaces 8d and 8d' into the spaces 8c and 8c' once, and then reenters the optical member 8 from the second entrance surfaces 8e and 8e'. After that, the second luminous flux emerges from the first exit surface 8b.

The second exit surfaces 8d and 8d' are formed as a cylindrical lens surface having a positive refractive power (or optical power, that is, the inverse of the focal length) in the vertical direction (direction orthogonal to the paper of FIG. 4, hereinafter, the direction is referred to as Z-direction), and converges the second luminous flux in the Z-direction. The radiation range is set to an angle range meeting the image-taking range through the taking lens.

Figure 5:
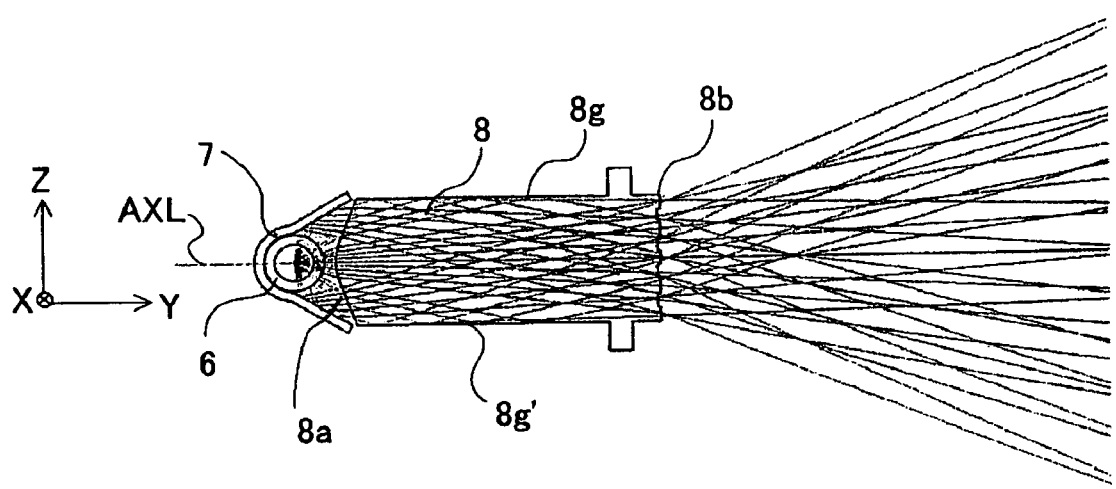
FIG. 5 is a side perspective view showing the illumination unit of Embodiment 1.

FIG. 5 shows a cross-sectional view of the illumination unit 5 when cutting the unit 5 at a plane (YZ-plane) orthogonal to the central axis of the flash discharge tube 6.

FIG. 5 shows the inner and outer diameters of the grass tube constituting the flash discharge tube 6. Such a discharge tube often emits light throughout the inner diameter for improved efficiency, and may be considered to emit light approximately uniformly from light-emitting points included in the inner diameter of the discharge tube. However, for description convenience, the luminous flux emitted from the center of the flash discharge tube 6 is regarded as representative luminous flux and the figure shows only the representative luminous flux.

Although the actual light distribution characteristic entirely changes in a slightly spreading direction due to the luminous fluxes emitted from the periphery of the discharge tube 6 in addition to the illustrated representative luminous flux, the actual light distribution characteristic is almost equal to the representative luminous flux's one. Therefore, the following description follows this representative luminous flux.

In FIG. 5, the luminous flux emitted forward from the discharge tube 6 at an angle equal to or smaller than a first angle with respect to the optical axis AXL directly enters the first entrance surface 8a, is converted into a luminous flux having a desired light distribution characteristic by the positive refractive power of the first entrance surface 8a, and then emerges from the first exit surface 8b.

The luminous flux emitted forward from the discharge tube 6 at an angle larger than the first angle and smaller than a second angle with respect to the optical axis AXL directly enters the first entrance surface 8a, is refracted by the first entrance surface 8a, is totally reflected by reflective surfaces 8g and 8g', and then emerges from the first exit surface 8b.

The luminous flux is converted into a luminous flux having a desired light distribution characteristic in the process.

The luminous flux emitted forward from the discharge tube 6 at an angle larger than the second angle with respect to the optical axis AXL enters the first entrance surface 8a after reflection on the reflector 7, is refracted by the first entrance surface 8a, and then emerges from the first exit surface 8b. The luminous flux is also converted into a luminous flux having a desired light distribution characteristic in the process.

The combined radiation range of these three luminous fluxes becomes the angle range meeting the image-taking range through the taking lens.

Here, the description will be made of the optical path of the luminous flux emitted backward from the flash discharge tube 6 though it is not shown in the figure. Part of the reflector 7, which has a semi-cylindrical shape concentric to the flash discharge tube 6, is disposed behind the flash discharge tube 6. The grass tube of the flash discharge tube 6 has a cylindrical shape concentric to the flash discharge tube 6. Therefore, the luminous flux emitted backward from the center of the discharge tube 6 and reflected on the reflector 7 returns to the center of the discharge tube 6 without being affected by the refraction at the glass tube. The action of the luminous flux that has returned to the center of the discharge tube 6 is approximately the same as the luminous flux shown in FIG. 5.

In the illumination unit 5 whose each surface has the above-mentioned shape, the luminous flux from the discharge tube 6 is converted into a luminous flux having a substantially even light distribution characteristic by the optical member 8 and reflector 7. The converted luminous flux emerges from the illumination unit 5 toward the object. Therefore, it is possible to produce a small illumination unit capable of reducing loss of light amount caused by radiation to the outside of the required radiation range, that is, the illumination unit having an extremely good efficiency.

Figure 6:
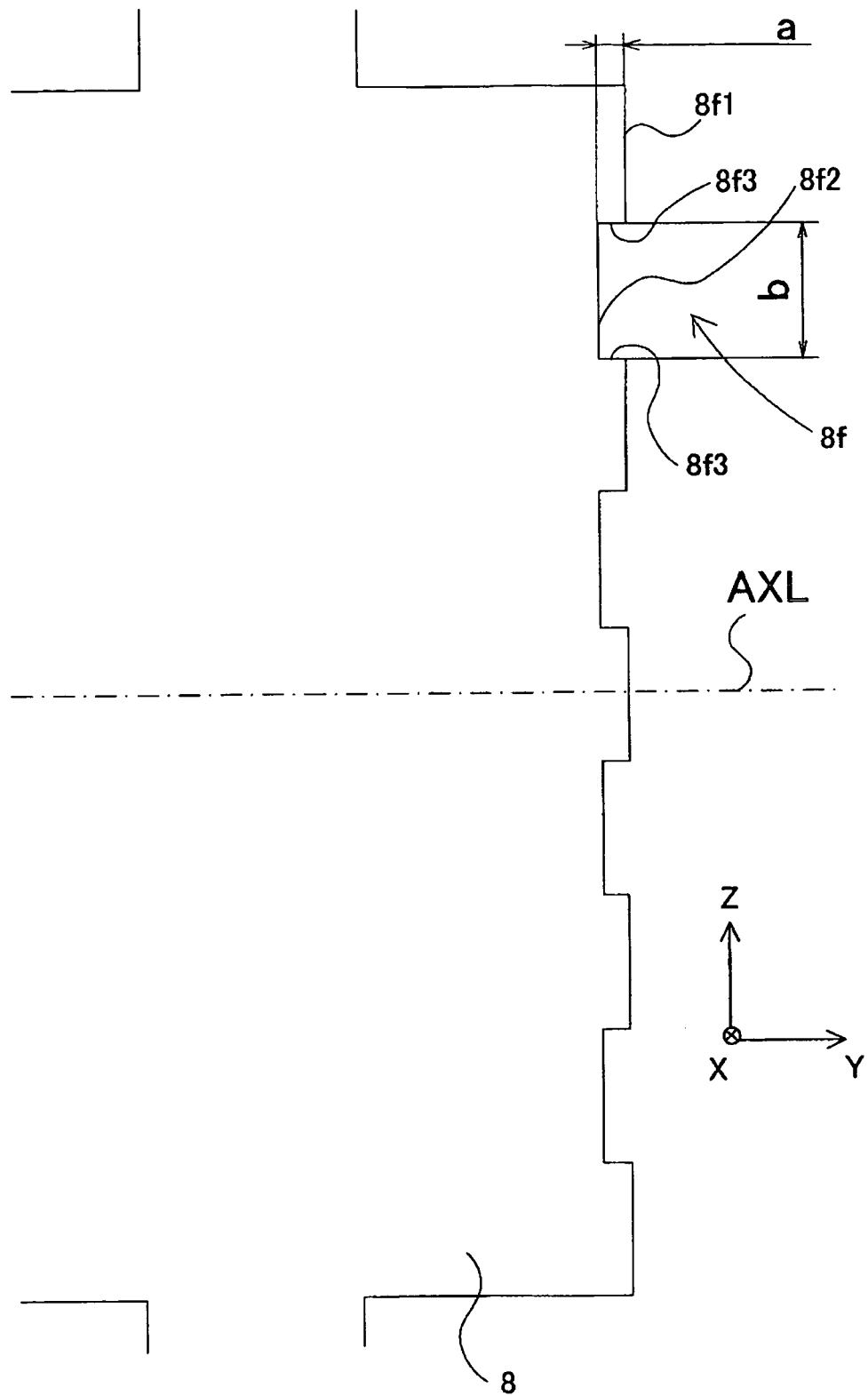
FIG. 6 is an enlarged sectional view showing the illumination unit of Embodiment 1.

Next, the description will be made of the shape of the first exit surface (exit portion) 8b in the optical member 8 with reference to FIG. 6. FIG. 6 is an enlarged view showing the vicinity of the first exit surface 8b on the YZ-section as FIG. 5.

A plurality of rectangular groove portions 8f are formed at a substantially constant pitch in the Z-direction (second direction) on the first exit surface 8b. In other words, the first exit surface 8b is constituted by first and second planes (planar surfaces) 8/1 and 8/2 arranged alternately in the Z-direction. The first plane 8/1 is formed at a front position in the optical axis direction. The second plane 8/2 is formed at a position posterior to the first plane 8/1.

Both of the first and second planes 8/1 and 8/2 are orthogonal to the optical axis direction (Y-direction). As shown in FIG. 3, the first and second planes 8/1 and 8/2 extend over the entire first exit surface 8b in the X-direction.

Furthermore, in this embodiment, a third plane 8/3 parallel to the optical axis direction is formed between the first and second planes 8/1 and 8/2 closest to each other in the Z-direction. The third plane 8/3 extends over the entire first exit surface 8b in the X-direction.

The terms 'orthogonal' and 'parallel' as used herein (in this specification and claims) mean not only being perfectly orthogonal and parallel, but also being deviated therefrom within an allowable error range not affecting optical characteristics.

FIG. 6 shows a case where a:b (aspect ratio)=1:5, where a represents the depth of the groove portion 8f, that is, the width of the third plane 8/3 in the Y-direction, b represents the width of the groove portion 8f, that is, the width of the second plane 8/2 in the Z-direction.

Figure 7:
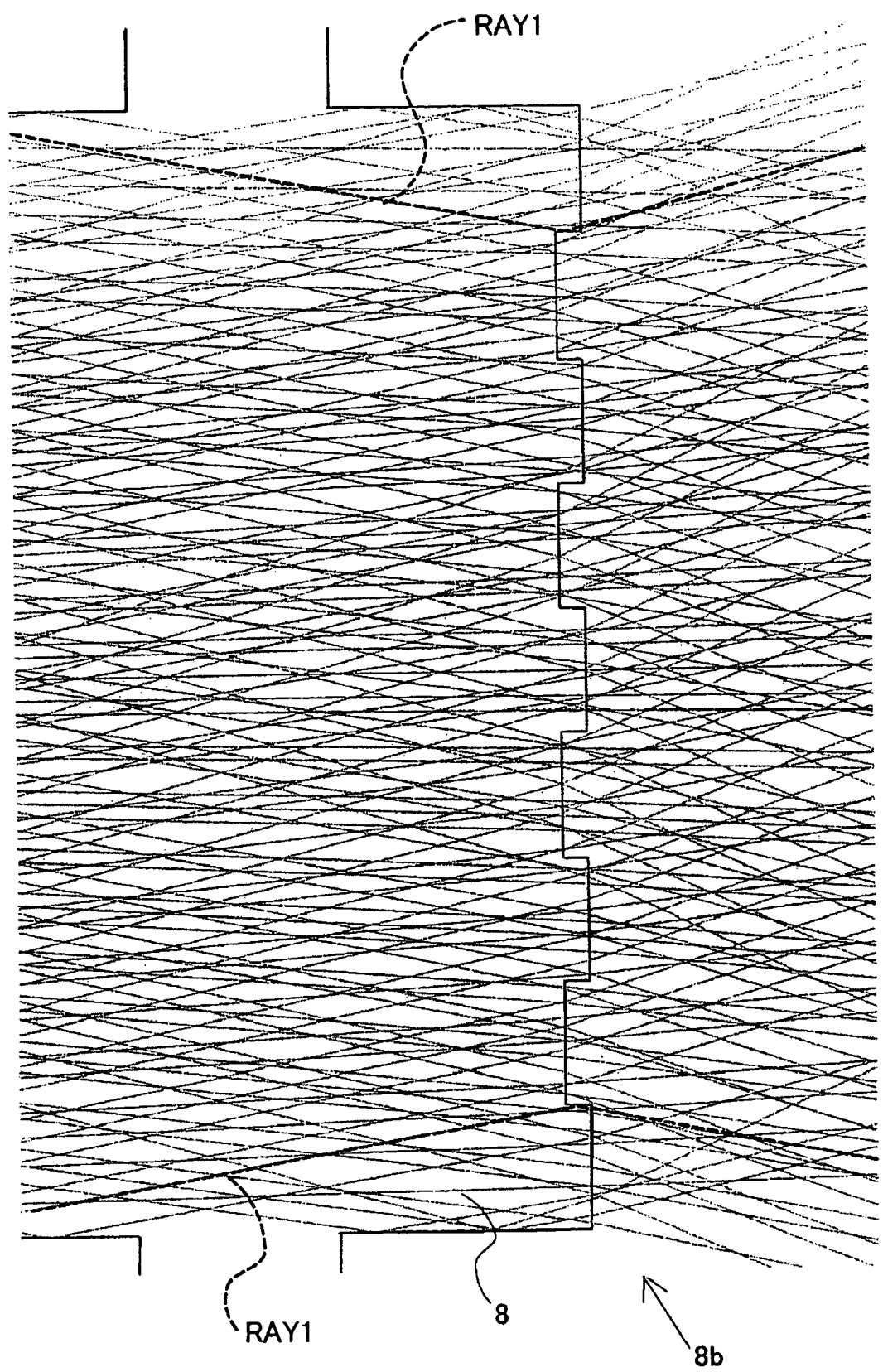
FIG. 7 is a light ray diagram in the exit portion of the illumination unit of Embodiment 1.

FIG. 7 is a tracing diagram of rays emitted from the center of the flash discharge tube 6 in the case shown in FIG. 6. As shown in FIG. 7, almost all rays emitted from the center of the flash discharge tube 6 are radiated on the object side from the first exit surface 8b. The rays shown as RAY1 by dashed lines are totally and symmetrically reflected in the vertical direction on the third planes 8/3 of the groove portions 8f, and radiated into the radiation range of the rays emerging from the optical member 8 without being reflected on the third plane 8/3. This shows that the total reflection on the third plane 8/3 has little influence on the entire light distribution characteristic.

As described above, in this embodiment, the groove portion 8f has a rectangular shape, and the first exit surface 8b is constituted by the first and second planes 8/1 and 8/2 orthogonal to the optical axis AXL and located at different anteroposterior positions, and the third plane 8/3 parallel to the optical axis AXL. This prevents the luminous flux from diverging, thereby making it possible to obtain a light distribution characteristic equivalent to that in a case where the first exit surface 8b is formed as a simple plane.

Figure 8A:
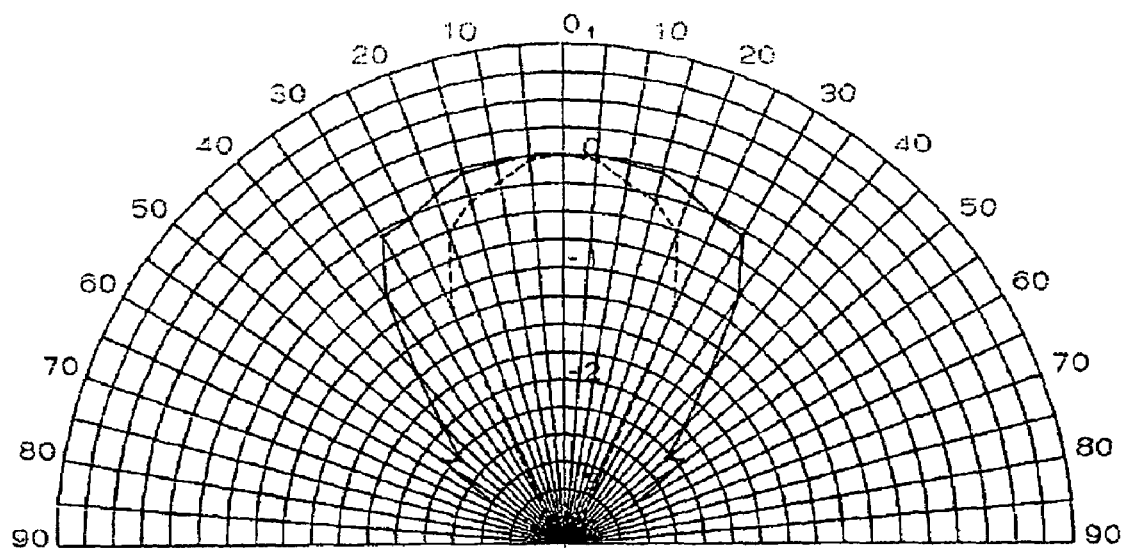
FIG. 8A shows a graph and table showing the simulation result of light distribution of the illumination unit in Embodiment 1.
Figure 8B:
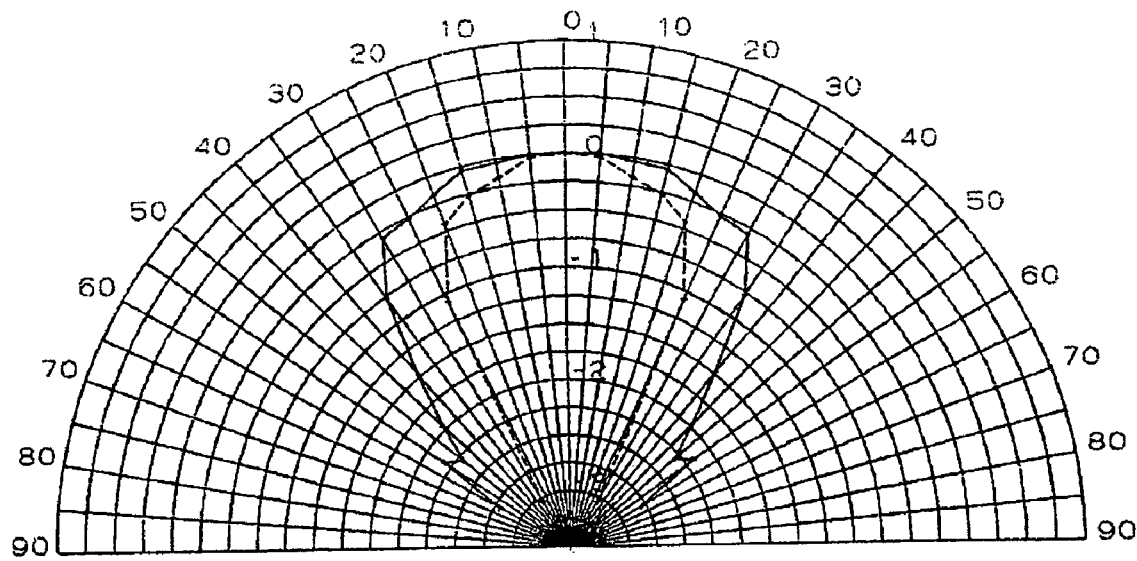
FIG. 8B shows a graph and table showing the simulation result of light distribution of a conventional illumination unit.

The light distribution characteristic diagram in the upper part of FIG. 8A shows a simulation result of the light distribution in a case where the rectangular groove portion 8f is formed on the first exit surface 8b as this embodiment. The table in the lower part of FIG. 8A numerically shows the same light distribution characteristic. On the other hand, the light distribution characteristic diagram in the upper part of FIG. 8B shows a simulation result of the light distribution in a case where the first exit surface 8b is formed as a simple plane. The table in the lower part of FIG. 8B numerically shows the same light distribution characteristic.

The simulation of light distribution shown in FIG. 8A was made under the condition that the total height of the first exit surface 8b in the Z-direction was 4.5 mm, the depth a of the groove portion 8f (width of the third plane 8/3 in the Y-direction) was 0.1 mm, the width b of the groove portion 8f (width of the second plane 8/2 in the Z-direction) was 0.5 mm, the pitch of the groove portions 8f in the Z-direction was 0.9 mm, and the number of the groove portion was five. The simulation of light distribution shown in FIG. 8B was made under the same condition except that the first exit surface 8b has no groove portion 8f.

The light distribution characteristic diagrams are shown by circular graphs, the lateral axis thereof showing radiation angles and the vertical axis showing values of logarithm in which the luminous intensity is 1 when the radiation angle is 0 degree. The solid line shows the luminous intensity in the horizontal direction (X-direction), and the dashed line shows the luminous intensity in the vertical direction (Z-direction).

These diagrams show that approximately the same light distribution characteristic is obtained in this embodiment's case where the groove portions 8f are formed on the first exit surface 8b and the case where the first exit surface 8b is a simple plane having no groove portion. Therefore, according to this embodiment's illumination unit 5, it is possible to obtain approximately the same radiation range as the illumination unit that is different only in having no groove portion and its radiation range is set so as to meet the image-taking range of the taking lens.

Figure 9:
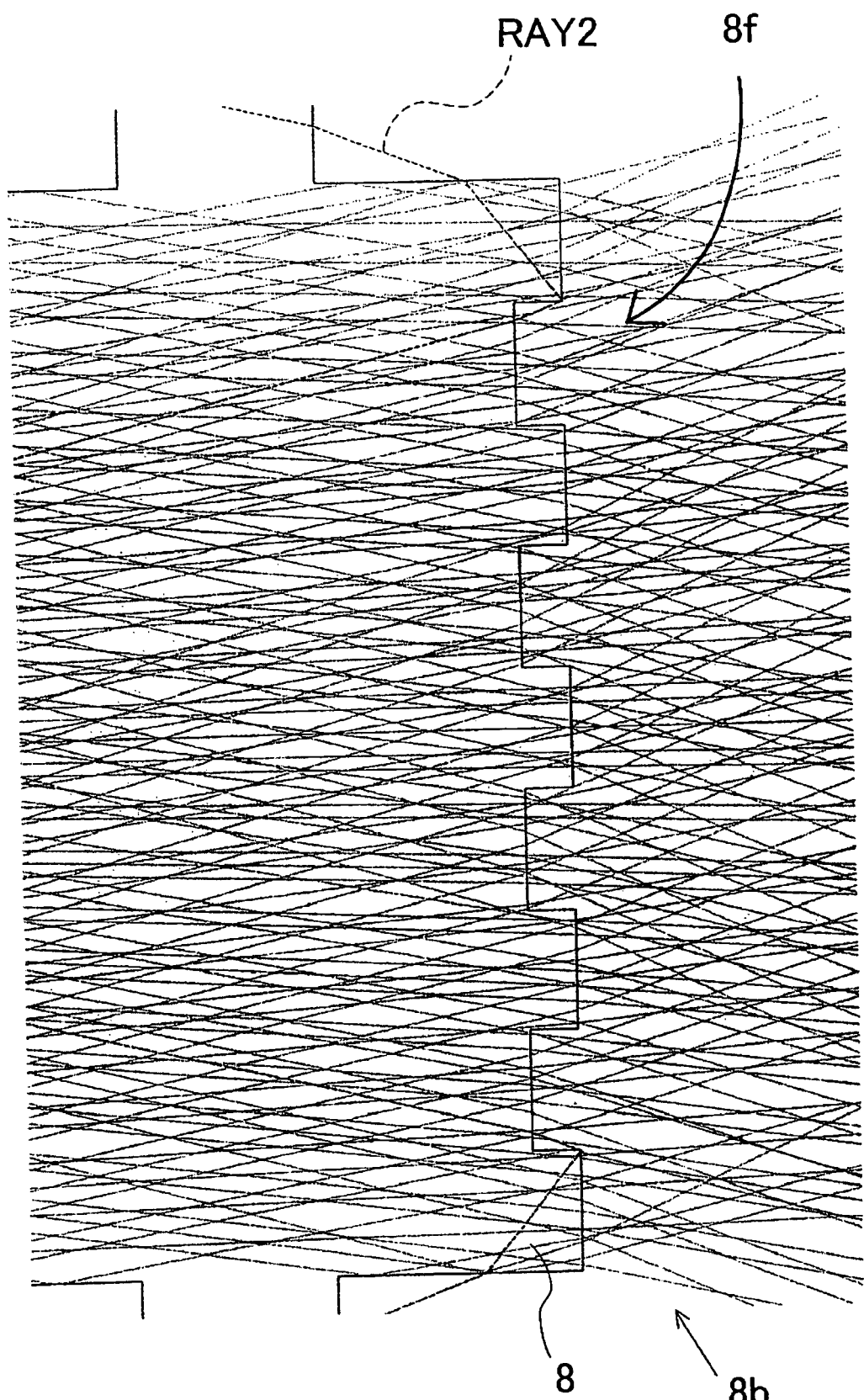
FIGS. 9 and 10 are light ray tracing diagrams in the exit portion of the illumination unit of Embodiment 1.
Figure 10:
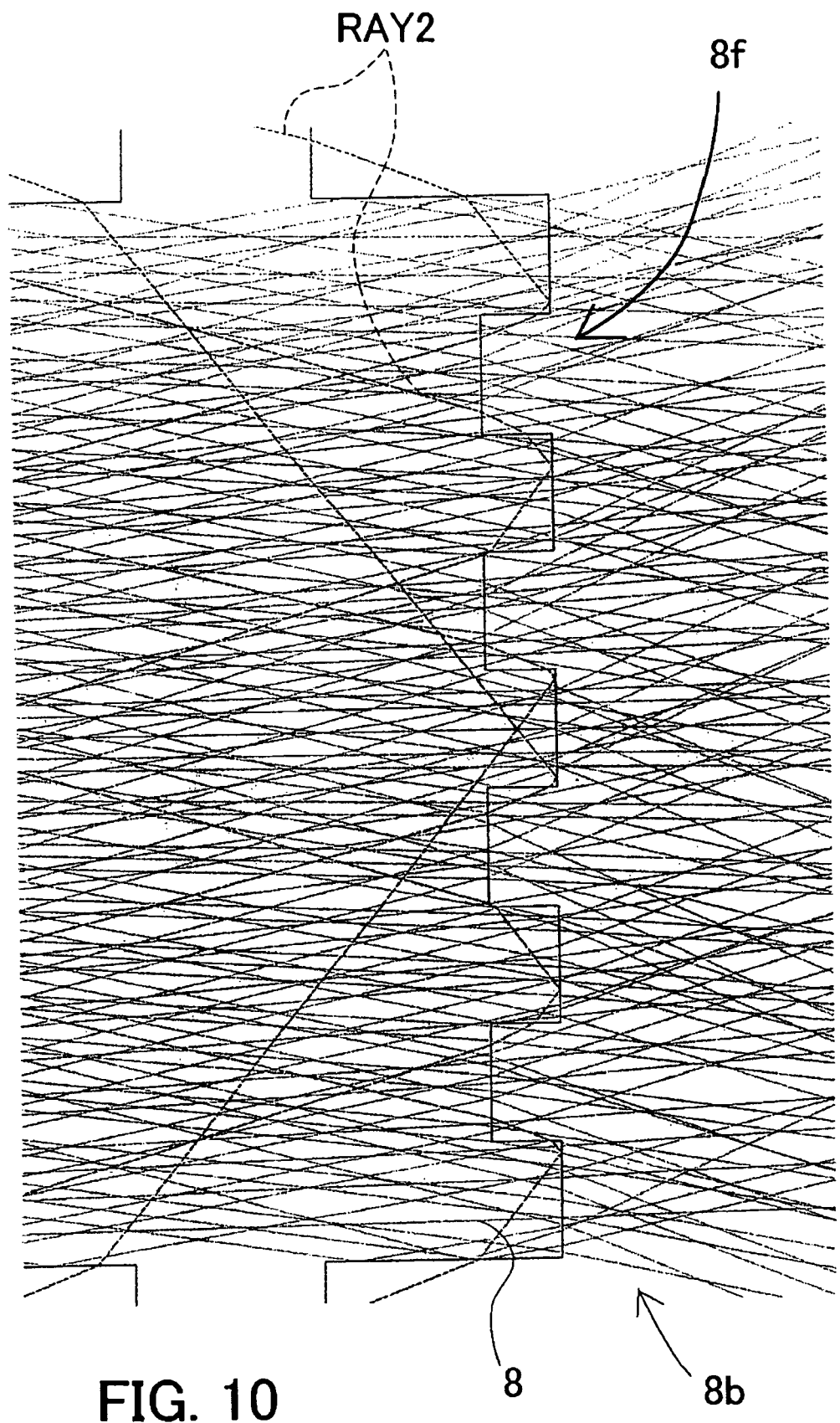

FIG. 9 shows the shape of the first exit surface 8b and a ray-tracing diagram in a case where the aspect ratio a:b of the groove portion 8f formed on the first exit surface 8b is 2:5. FIG. 10 shows those in a case where the aspect ratio a:b of the groove portion 8f is 3:5.

In these figures, the rays RAY2 shown by the dashed line are totally reflected on the first exit surface 8b (first plane 8f1) due to an influence of changing the aspect ratio of the groove portion 8f from that in FIG. 7.

As is shown from the comparison between FIG. 7 and FIGS. 9 and 10, a lager value of a/b increases the rays totally reflected on the first exit surface 8b. Therefore, it is desirable to set the value of a/b as small as possible to prevent changes of the light distribution characteristic and radiation efficiency from those of the illumination unit having no groove portion 8f.

Specifically it is desirable to set the value as follows:

$a/b \leq 0.35$.

The configuration of the first exit surface 8b shown in FIG. 7 overlaps the outer shape line of the flash discharge tube 6 and the line of the third plane 8f3 constituting the groove portion 8b, or arranges them parallel to each other in the Z-direction, when viewed from the optical axis direction. This makes it possible to obscure the presence of the flash discharge tube 6. Thereby, the inside of the illumination unit becomes hard to be seen from the outside, the appearance of the illumination unit is improved, and the exterior appearance quality of the entire camera is increased.

Figure 11:
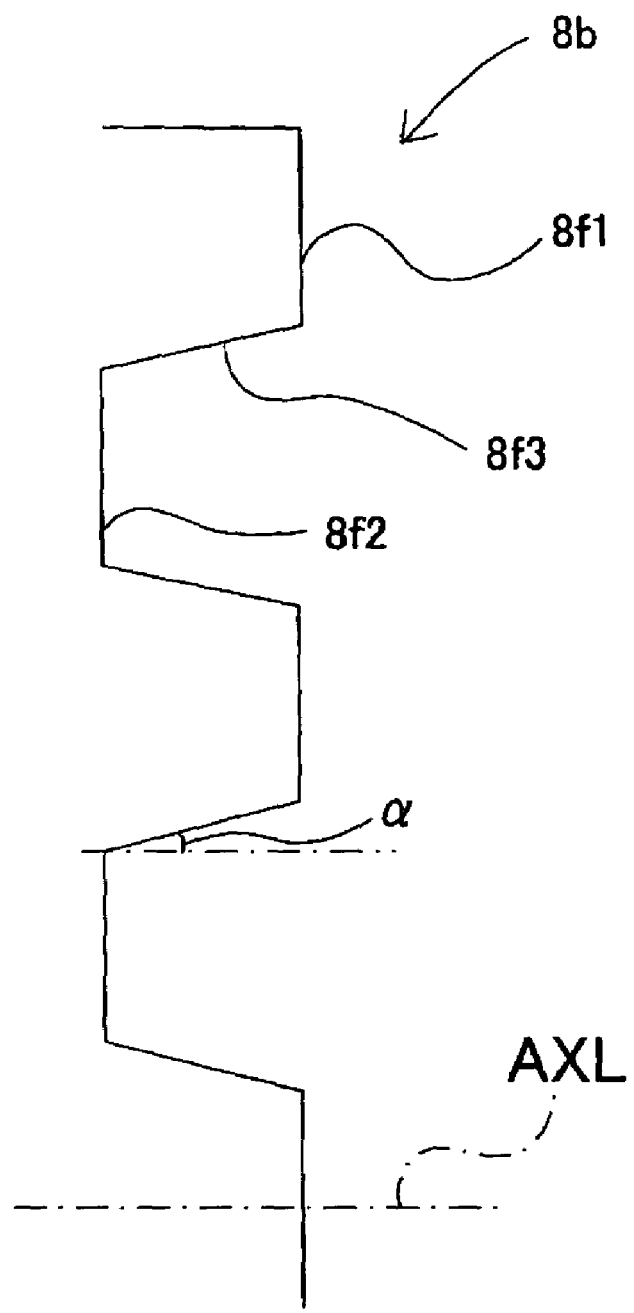
FIG. 11 is a sectional view showing a modified example of the illumination unit of Embodiment 1.

In the above embodiment, the description was made of the case where the third plane 8f3 constituting the groove portion 8f on the first exit surface 8b is a plane parallel to the optical axis direction. However, as shown in FIG. 11, the third plane 8f3 may be formed as a plane opened (inclined) toward the object side with respect to the optical axis direction.

For example, the above-mentioned inclined third plane 8f3 facilitates die removal from the resin molded optical member 8. However, it is necessary to suppress the inclination angle α with respect to the optical axis direction to a small angle so that the light distribution characteristic and radiation efficiency may not be deteriorated compared to those of the optical member having no groove portion.

Embodiment 2

The description was made of the case where two planes 8f1 and 8f2 located at different anteroposterior positions were formed alternately on the first exit surface 8b in the above-described Embodiment 1. However, as shown in FIG. 12, a plurality of planes 8f11 to 8f15 orthogonal to the optical axis and located different positions in the optical axis direction may be formed stepwise, in other words, so that their positions are changed in one of the optical axis direction.

Figure 12:
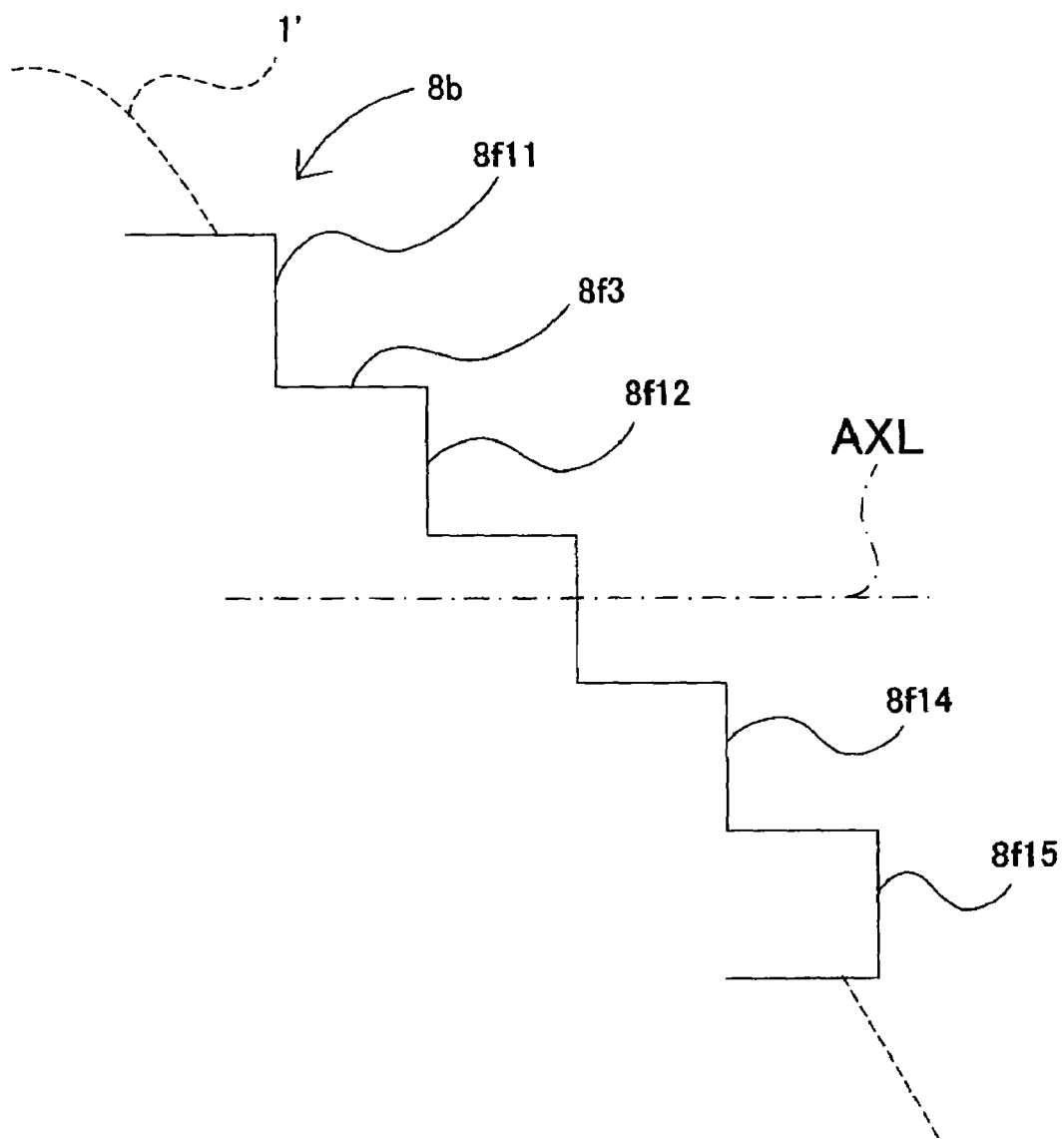
FIG. 12 is an enlarged sectional view showing the illumination unit that is Embodiment 2 of the present invention.

In FIG. 12, the dashed line shows the outer shape of the camera body 1' having an inclined or curved front surface. The positions of the plurality of planes 8f11 to 8f15 constituting the first exit surface 8b are changed forward or backward in accordance with the inclined or curved front surface of the camera body 1'. This makes it possible to improve the design of the entire camera including the illumination unit 6. In this case, the height of the planes 8f11 to 8f15 and their pitch in the optical axis direction may be constant or different. The plane 8f3 between the planes 8f11 to 8f15 may be a plane parallel or inclined with respect to the optical axis direction.

Embodiment 3

The description was made of the case where two planes 8f1 and 8f2 on the first exit surface 8b were planes orthogonal to the optical axis direction (Y-direction) in the above-described Embodiment 1. However, as shown in FIG. 13, a plurality of planes 8f21 to 8f24 inclined with respect to the optical axis direction may be formed at different positions in the optical axis direction, in other words, so that their positions are changed in one of the optical axis direction.

Figure 13:
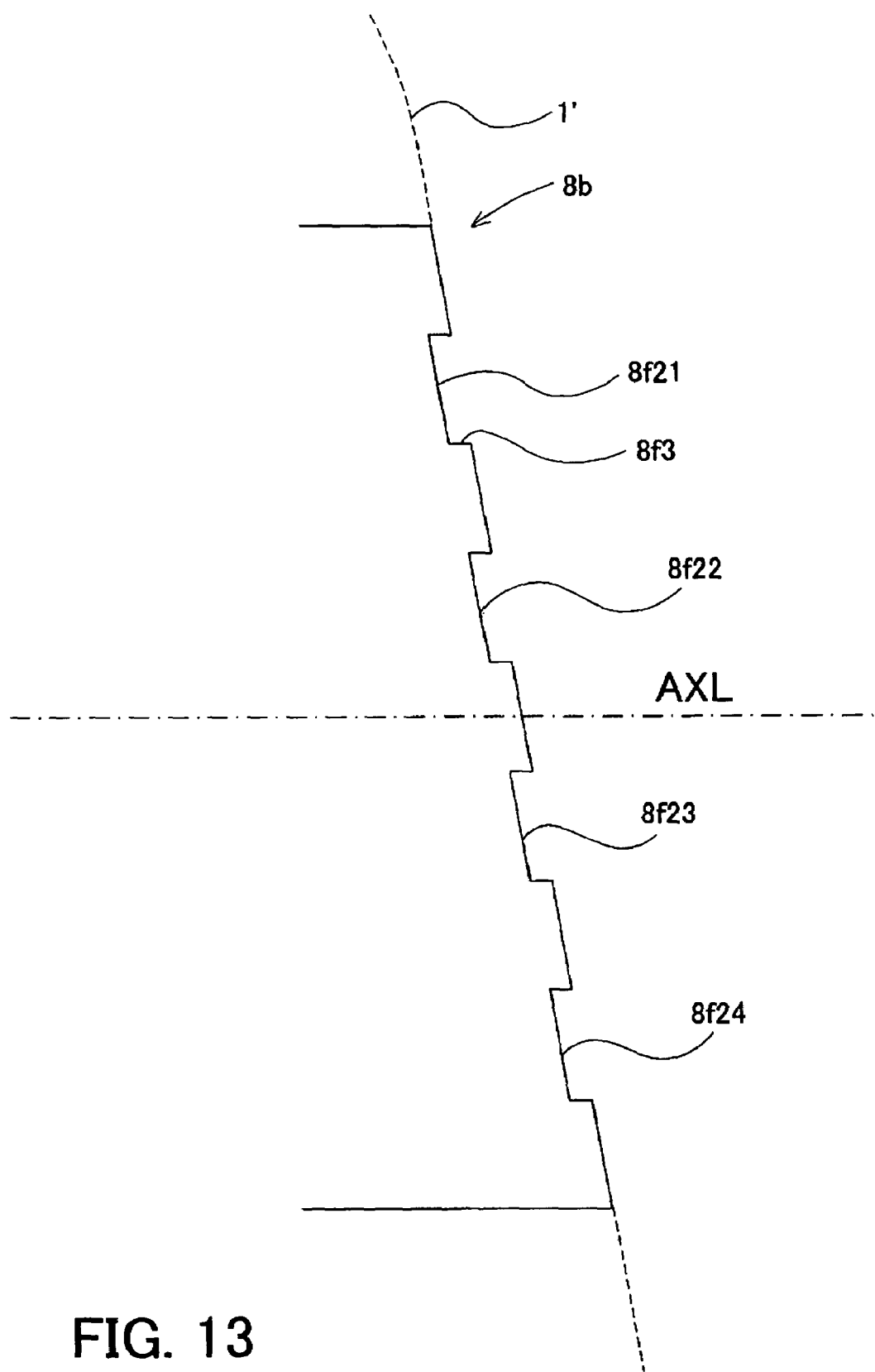
FIG. 13 is an enlarged sectional view showing the illumination unit that is Embodiment 3 of the present invention.

In FIG. 13, the dashed line shows the outer shape of the camera body 1' having an inclined front surface. The positions of the plurality of inclined planes 8f21 to 8f24 constituting the first exit surface 8b are changed forward or backward in accordance with the inclined front surface of the camera body 1'. This makes it possible to improve the design of the entire camera including the illumination unit 6. In this case, the height of the inclined planes 8f21 to 8f24 and their pitch in the optical axis direction may be constant or different. The plane 8f3 between the inclined planes 8f21 to 8f24 may be a plane parallel or inclined with respect to the optical axis direction.

Embodiment 4

The description was made of the case where two planes 8f1 and 8f2 on the first exit surface 8b were planes orthogonal to the optical axis direction (Y-direction) in the above-described Embodiment 1. However, as shown in FIG. 14, a plurality of curved surfaces 8f31 to 8f34 may be formed at different positions in the optical axis direction, in other words, so that their positions are changed in one of the optical axis direction.

Figure 14:
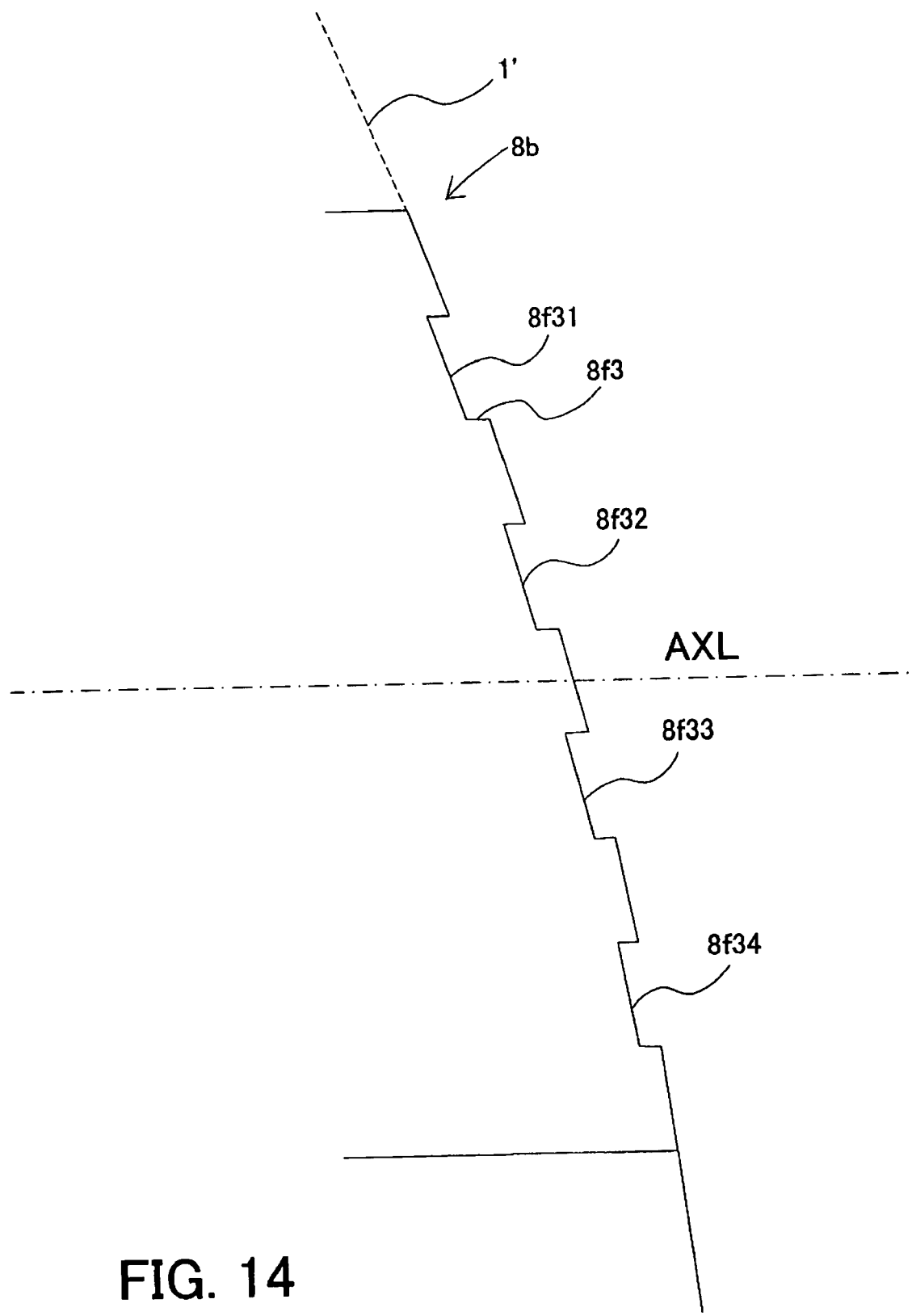
FIG. 14 is an enlarged sectional view showing the illumination unit that is Embodiment 4 of the present invention.

In FIG. 14, the dashed line shows the outer shape of the camera body 1' having a curved front surface. The positions of the plurality of curved surfaces 8f31 to 8f34 constituting the first exit surface 8b are changed forward or backward in accordance with the curved front surface of the camera body 1'. This makes it possible to improve the design of the entire camera including the illumination unit 6. In this case, the height of the curved surfaces 8f31 to 8f34 and their pitch in the optical axis direction may be constant or different. The plane 8f3 between the curved surfaces 8f31 to 8f34 may be a plane parallel or inclined with respect to the optical axis direction.

As described above, according to each embodiment, it is possible to obtain an even light distribution characteristic in the required radiation range and good radiation efficiency while reducing the vertical height of the illumination unit, and improve the exterior appearance with little influence on the light distribution characteristic. Also, loss of light amount is very small. Moreover, the present invention is easy to apply to an illumination apparatus including an optical member utilizing total reflection, and effective particularly in miniaturizing the illumination apparatus and an image-taking apparatuses with the same.

Although the pitch, height and depth of the groove portion 8f were constant in each above-described embodiment, they may be changed in the present invention. Moreover, the number of the groove portions is not limited to that of each embodiment. The pitch and number of the groove portions can be determined from a design standpoint.

Furthermore, the entrance surface of the optical member had an optical power, and the optical member had a reflective surface totally reflecting light in each above-described embodiment. However, in a case where a Fresnel lens is used as the optical member, a surface other than the Fresnel lens surface on the optical member may be formed in the shape described in each embodiment.

Moreover, although the illumination unit included a reflector having a function of surface reflection in each above-described embodiment, an optical element made of a transparent body leading light forward by internal total reflection can be used instead of the reflector.

Moreover, although the optical member had planes orthogonal to the optical axis and extending over the first exit surface in the X-direction in each above-described embodiment, planes located at different anteroposterior positions can be formed alternately, or planes orthogonal to the optical axis can be formed stepwise, in the X-direction.

The shape of the optical member in the present invention is not limited to that described in each embodiment, and any shape having the first entrance surface and the final exit surface can be acceptable.

This application claims a foreign priority benefit based on Japanese Patent Application No. 2004-381783, filed on Dec. 28, 2004, which is hereby incorporated by reference herein in its entirety as if fully set forth herein.

What is claimed is:

1. An illumination apparatus which is provided in image-taking apparatus, said illumination apparatus comprising:
   a light-emitting tube which extends in a first direction; and
   an optical member which includes an entrance portion where a luminous flux from the light-emitting tube enters and an exit portion where the luminous flux exits,
   wherein said optical member is integrally formed,
   wherein the exit portion has a plurality of steps that is, in the optical axis direction, most away from said light-emitting tube in said optical member, the steps including first and second surfaces where the luminous flux exits, the first and second surfaces extending in the first direction, being orthogonal to the optical axis direction of the illumination apparatus, and being alternately arranged in the second direction, the second surfaces being, in the optical axis direction, closer to said light-emitting tube than the first surfaces,
   wherein a plane parallel to the optical axis direction is provided between the first and second surfaces that is closest to each other in the second direction,
   wherein the optical member includes a reflective surface which reflects the luminous flux from the entrance portion in the second direction and leads the luminous flux to the exit portion, and
   wherein the following condition is satisfied:

$a/b < 0.35$ where a represents a positional difference between two of the plurality of surfaces, the two surfaces being closest to each other in the second direction, and b represents the width of each of the surfaces in the second direction.

2. An image-taking apparatus comprising:
   the illumination apparatus according to claim 1; and
   an image-taking system which takes an image of an object illuminated by the luminous flux from the illumination apparatus.

* * * * *